Jan. 3, 1939.  H. C. BOGART  2,142,264
HARROW
Filed Feb. 9, 1938  2 Sheets-Sheet 2
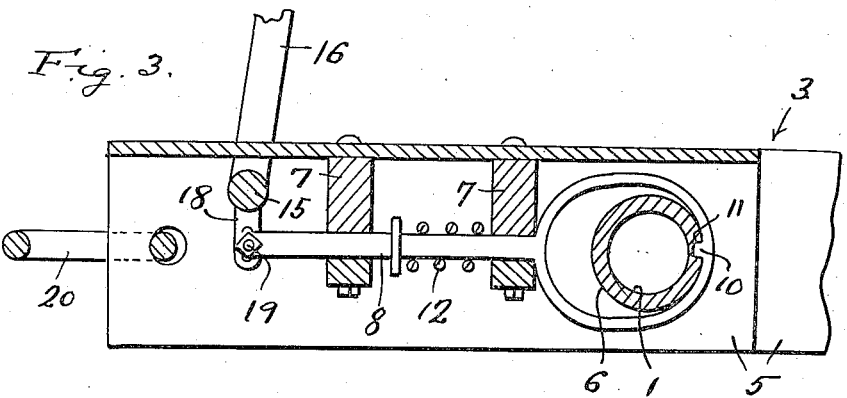
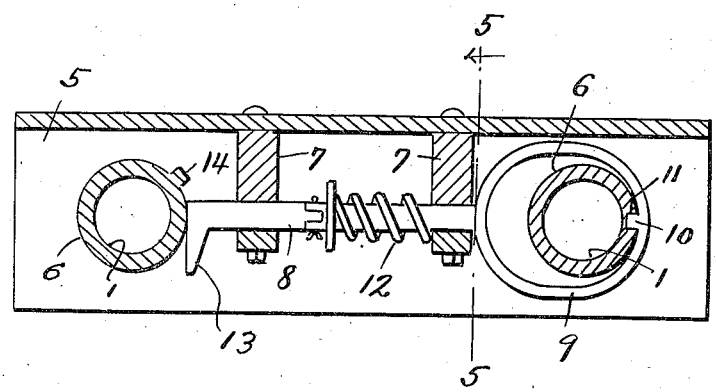
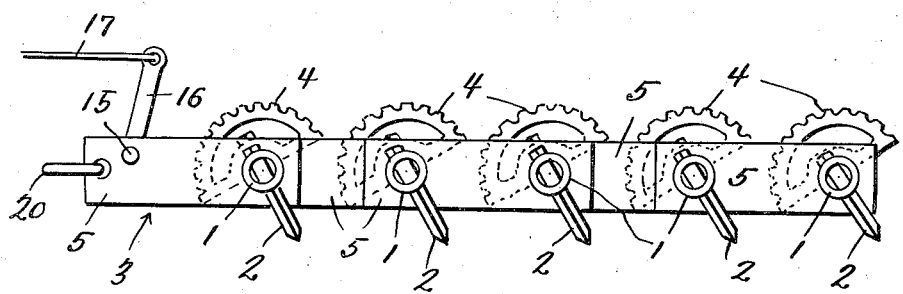
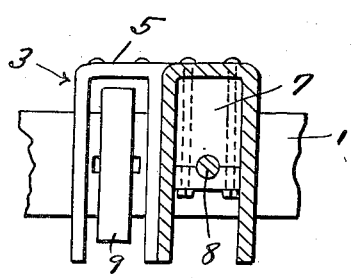
Inventor
Henry C. Bogart
By Clarence A. O'Brien
Hyman Berman
Attorneys Patented Jan. 3, 1939

2,142,264

UNITED STATES PATENT OFFICE 2,142,264

HARROW

Henry C. Bogart, Blue Earth, Minn., assignor of twenty-five per cent to Jack Cochran Spornitz, Jenkins, Minn.

Application February 9, 1938, Serial No. 189,676

5 Claims. (Cl. 55—34)

The present invention relates generally to agricultural implements and more particularly to new and useful improvements in harrows and has for its primary object to provide, in a manner as hereinafter set forth, a device of this character embodying a novel construction and arrangement whereby the teeth may be conveniently cleared or cleaned while the implement is in use.

Other objects of the invention are to provide a harrow of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in side elevation thereof.

Figure 3 is a view in vertical longitudinal section, taken substantially on the line 3—3 of Fig. 1.

Figure 4 is a view in vertical longitudinal section, taken substantially on the line 4—4 of Fig. 1.

Figure 5 is a cross sectional view, taken substantially on the line 5—5 of Fig. 4.

Figure 1:
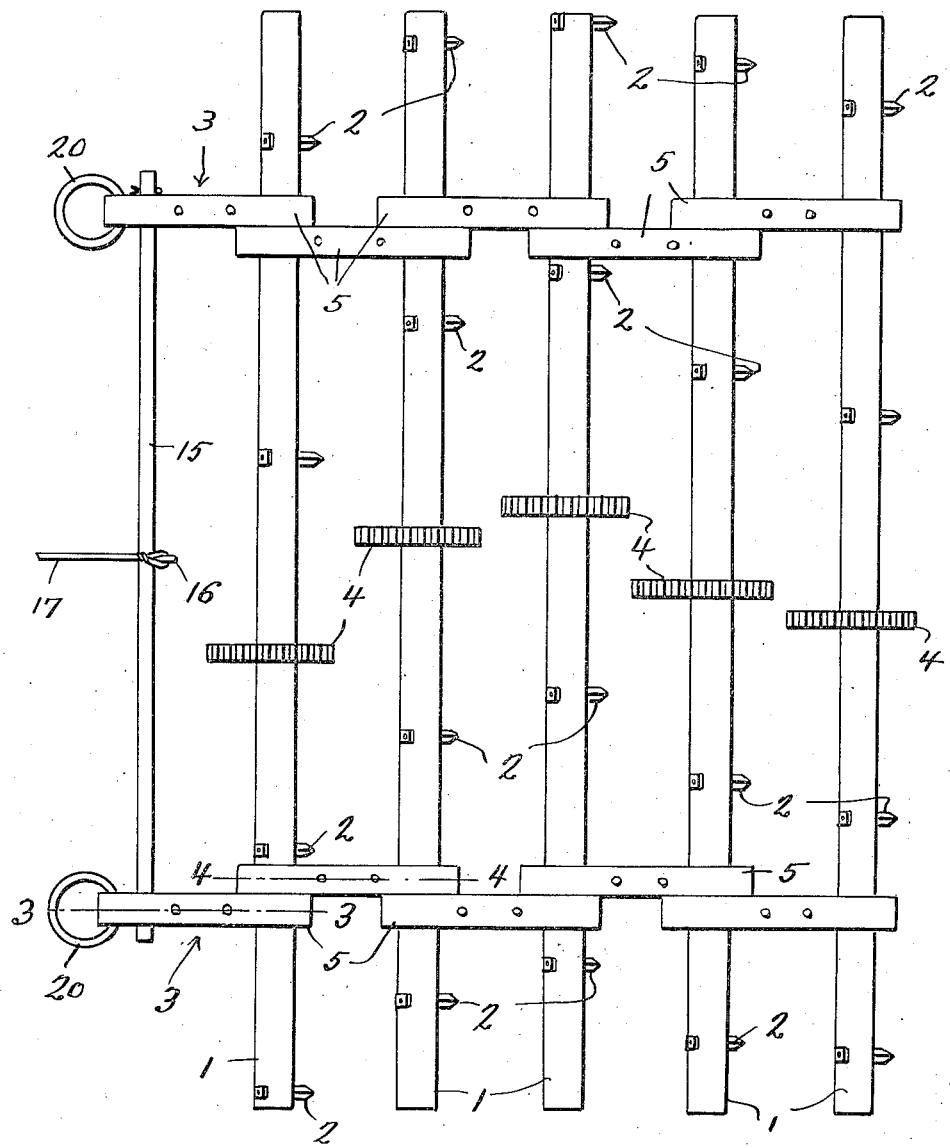
Figure 1 is a top plan view of a harrow constructed in accordance with the present invention.

Referring now to the drawings in detail, it will be seen that the embodiment of the invention which has been illustrated comprises a plurality of spaced, parallel, transverse tooth bars 1 in the form of metallic tubes. Fixed in the bars 1 at spaced points are teeth 2. The tooth bars 1 are journalled for rotation in side rails or the like which are designated generally by the reference numeral 3. Fixed on the tooth bars 1 at an intermediate point and on the opposite sides thereof from the teeth 2 are notched segments 4 the purpose of which will be presently set forth.

Each side rail 3 comprises overlapping metallic sections or links 5 of substantially U-shaped cross section, as seen to advantage in Fig. 5 of the drawings. The adjacent end portions of the links 5 have formed therein aligned circular openings 6 in which the tooth bars 1 are journalled.

Mounted in the links 5 are bearings 7 in the form of hangers. Mounted for longitudinal sliding movement in the bearings 7 are latches 8 for releasably securing the tooth bars 1 against rotation. The latches 8 comprise substantially oval loops or the like 9 on their rear ends which encircle the adjacent tooth bars 1, as clearly shown in Figs. 3 and 4 of the drawings. The loops 9 are provided with inwardly projecting lugs 10 which are engageable in sockets 11 provided therefor in the tooth bars 1 for releasably securing said tooth bars against rotation. Coil springs 12 yieldingly urge the latches 8 forwardly toward operative or locking position. The latches 8, with the exception of those in the front links 5, include feet 13 which ride on the adjacent tooth bars 1 (see Fig. 4). The tooth bars 1 include cams or the like 14 which are engageable with the feet 13 for actuating the latches 8 against the tension of the coil springs 12 for disengaging the lugs 10 from the sockets 11 in a manner to release the tooth bars 1.

Journalled in the forward end portions of the side rails 3 is a shaft 15 having fixed thereon a lever 16. Connected to the lever 16 is a trip rope 17. Fixed on the end portions of the shaft 15 are arms 18 (see Fig. 3) which are coupled to the latches 8 in the front links 5 by pin and slot connections 19. Hitch rings 20 are provided in the forward end portions of the side rails 3.

It is thought that the operation of the device will be readily apparent from a consideration of the foregoing. When it is desired to clean or clear the teeth of the implement, the shaft 15 is rocked in a manner to actuate the latches 8 in the forward links 5 against the tension of their coil springs 12 for disengaging the lugs 10 in the loops 9 of said latches from the sockets 11 in the first or front tooth bar 1, thereby releasing said tooth bar. When thus released, the first tooth bar 1, with the implement moving forwardly, is caused to rotate by the teeth 2 sufficiently to bring the segments 4 into contact with the ground for continuing the rotation of said tooth bar. Thus, weeds, trash, etc., that may accumulate on the teeth 2 are released. Upon the completion of one revolution of the tooth bar it is again locked by its latches 8. Just before the first tooth bar 1 completes its revolution, the cams 14 thereon engage the teeth 13 of the latches 8 of the second tooth bar 1 for releasing said second tooth bar and this operation continues until all of the tooth bars have been released for clearing the teeth thereon.

It is believed that the many advantages of a harrow constructed in accordance with the present invention will be readily understood and although a preferred embodiment of the implement is as illustrated and described, it is to be understood that changes in the details of construction and in the combination and arrangement of parts may be resorted to which will fall within the scope of the invention as claimed.

What is claimed is:—

1. A harrow comprising a pair of side rails, each side rail including a plurality of overlapping links of substantially U-shaped cross section, transverse tooth bars journalled in the adjacent end portions of the links, teeth mounted in said tooth bars, spring pressed latches slidably mounted in the links and engageable with the tooth bars for releasably securing said tooth bars against rotation, manually operable means mounted on one end portion of the side rails for actuating certain of the latches for releasing one of the tooth bars, and means on certain of the tooth bars for actuating the other latches for successively releasing the other tooth bars.

2. A harrow comprising a pair of side rails, tooth bars journalled on said side rails, latches slidably mounted on the side rails, said latches including means engageable with one of the tooth bars for releasably locking said one tooth bar against rotation, and means on the other tooth bar for actuating the latches for releasing said one tooth bar.

3. A harrow comprising a pair of side rails, tooth bars rotatably mounted on said side rails, a latch slidably mounted on one of the side rails and including a loop encircling one of the tooth bars, means on said loop engageable with said one tooth bar for releasably locking same against rotation, and means on the other tooth bar for actuating the latch for releasing said one tooth bar.

4. A harrow comprising a pair of side rails, tooth bars journalled on said side rails, one of said tooth bars having a socket therein, a latch slidably mounted on one of the side rails and including a loop encircling said one tooth bar, a lug in the loop engageable in the socket for releasably locking said one tooth bar against rotation, the latch further including a foot on one end, and a cam on the other tooth bar engageable with said foot for actuating the latch for releasing said one tooth bar.

5. A harrow comprising a pair of side rails of substantially U-shaped cross section, tooth bars journalled in said side rails, a latch slidably mounted in one of the side rails, coacting means on said latch and one of the tooth bars for releasably locking said one tooth bar against rotation, resilient means yieldingly urging the latch toward operative position, and means on the other tooth bar for actuating the latch for releasing said one tooth bar.

HENRY C. BOGART.